United States Patent
Matsumoto et al.

(10) Patent No.: US 7,050,672 B1
(45) Date of Patent: *May 23, 2006

(54) POLARIZATION-MAINTAINING OPTICAL FIBER AND POLARIZATION-MAINTAINING OPTICAL FIBER COMPONENT

(75) Inventors: Ryokichi Matsumoto, Sakura (JP); Hideki Sasaki, Sakura (JP); Kenji Nishide, Sakura (JP); Ryozo Yamauchi, Sakura (JP); Shigefumi Yamasaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 703 days.

This patent is subject to a terminal disclaimer.

(21) Appl. No.: 09/638,162

(22) Filed: Aug. 14, 2000

(30) Foreign Application Priority Data

Aug. 20, 1999 (JP) .......................................... 11-234782

(51) Int. Cl.
G02B 6/27 (2006.01)

(52) U.S. Cl. .............................. 385/28; 385/30; 385/43; 385/48

(58) Field of Classification Search ............. 385/27–30, 385/43, 48
See application file for complete search history.

(56) References Cited

U.S. PATENT DOCUMENTS

| | | | |
|---|---|---|---|
| 5,024,501 A | 6/1991 | Taya et al. ..................... 350/65 |
| 5,317,575 A | 5/1994 | Aniano | |
| 5,420,949 A | 5/1995 | Arima et al. ................... 385/65 |
| 5,689,578 A | 11/1997 | Yamauchi et al. ........... 385/123 |
| 6,463,195 B1 * | 10/2002 | Sasaki et al. .................. 385/43 |

FOREIGN PATENT DOCUMENTS

| | | | |
|---|---|---|---|
| EP | 1079247 A2 * | 2/2001 | |
| JP | 60 083906 A | 5/1985 | |
| JP | 60-242406 | 12/1985 | |
| JP | SHO 62-30602 | 7/1987 | |

(Continued)

OTHER PUBLICATIONS

Hiroshi Suganuma et al., "Pure silica core polarization maintaining fiber" European conference on optical communication, pp. 499–502 XP 000145174.
Morishita et al., Journal of Lightwave Technology, Nov. 1991, vol. 9, No. 11, pp. 1503–1507.
Australian Office Action dated Aug. 26, 2003 for a related patent application.
Translation of the Japanese Office action dated Sep. 30, 2003, and translation of the abstracts for JP 63–208809, 60–242406, 62–222206, 08–313749, 01–287603, 08–043657 and 03–206405.

Primary Examiner—Akm Enayet Ullah
Assistant Examiner—Jerry T Rahll
(74) Attorney, Agent, or Firm—Chadbourne & Parke, LLP

(57) ABSTRACT

A polarization-maintaining optical fiber component which suppresses coupling of propagating light to a high-order mode at the optical coupling section of the polarization-maintaining optical fiber component, caused by different refractive indexes between the stress applying sections and the cladding, thus reducing excess loss, is constructed by using a polarization-maintaining optical fiber having stress applying sections arranged symmetrically to each other with respect to a core in a cladding surrounding the core, wherein the largest one of those concentric circles of the core or the said cladding which do not reach the stress applying sections and do not include the stress applying sections within has a diameter of 20 μm or greater.

7 Claims, 2 Drawing Sheets

FOREIGN PATENT DOCUMENTS

| | | |
|---|---|---|
| JP | 62-222206 | 9/1987 |
| JP | 63-208809 | 8/1988 |
| JP | 01 134403 A | 5/1989 |
| JP | 01-287603 | 11/1989 |
| JP | HEI 2-271307 | 11/1990 |
| JP | 03-206405 | 9/1991 |
| JP | HEI 4-146849 | 5/1992 |
| JP | 04-107511 | 9/1992 |
| JP | 05 072433 A | 3/1993 |
| JP | 08-043657 | 2/1996 |
| JP | 08-313749 | 11/1996 |
| JP | 2649271 | 9/1997 |

* cited by examiner

# US 7,050,672 B1

POLARIZATION-MAINTAINING OPTICAL FIBER AND POLARIZATION-MAINTAINING OPTICAL FIBER COMPONENT

BACKGROUND OF THE INVENTION

1. Field of the Invention

The present invention relates to polarization-maintaining optical fiber components which is useful in the optical fiber communication field, the field of sensors using optical fibers and the like, such as a polarization-maintaining optical fiber coupler which couples and branches lights while maintaining the polarization of light in optical fibers, and a polarization beam splitter which decouples and couples polarized waves perpendicular to each other, and a polarization-maintaining optical fiber to be used in producing those optical fiber components. This application claims the priority of Japanese Patent Application No. 11-234782, which is incorporated herein by reference.

2. Background Art

A polarization-maintaining optical fiber is designed by providing the stress distribution in a single-mode optical fiber with an anisotropical property to lift the degeneracy between two orthogonal modes that propagate in the optical fiber, thus yielding a difference in the propagation constant, so that coupling between modes is canceled. Accordingly, when light having a certain polarized wave enters an optical fiber, it propagates while maintaining only its polarized wave.

While there are various kinds of polarization-maintaining optical fibers, a well-known one is a stress applying type which has a stress applying section provided in the cladding. Depending on the shape of the stress applying section, this type is called a PANDA (Polarization maintaining AND Absorption reducing) fiber (hereinafter referred to as "PANDA fiber"), a bow tie polarization-maintaining optical fiber or an elliptic jacket polarization-maintaining optical fiber. Of those fibers, the PANDA fiber is widely used because of its large birefringent index and excellent polarization-maintaining characteristics.

FIG. 4 exemplifies a conventional PANDA fiber. This PANDA fiber 4 comprises a core 1 having a high refractive index, a cladding 2 provided concentrical to the core 1 and having a lower refractive index than that of the core 1, and two stress applying sections 3 arranged in the cladding 2 symmetrically to each other around the core 1 and having a circular cross section and generally having a lower refractive index than the cladding 2.

The stress applying section 3 uses a material of a relatively large coefficient of thermal expansion. In the process of manufacturing the PANDA fiber 4 by melt-drawing the preform of the optical fiber, therefore, different stresses are applied to the core 1 from the horizontal and vertical directions at the time glass is solidified. As a result, a large distortion is non-isotropically applied to the core 1, so that the PANDA fiber 4 will have a birefringent property.

Polarization-maintaining optical fiber components which comprise such polarization-maintaining optical fibers include a polarization-maintaining optical fiber coupler which branches and couples lights while maintaining the plane of polarization, a polarization beam splitter or a polarization beam combiner which decouples and couples polarized waves perpendicular to each other.

Those polarization-maintaining optical fiber components are manufactured by placing the cores of a plurality of polarization-maintaining optical fibers in close contact to one another and constructing an optical coupling section which causes optical coupling between optical fibers.

A fused elongation scheme and a polishing scheme can be used to make the cores of a plurality of polarization-maintaining optical fibers to closely contact one another. The fused elongation scheme however is advantageous from the viewpoint of reliability of workability.

The fused elongation scheme is a method of manufacturing a polarization-maintaining optical fiber component by laying a plurality of polarization-maintaining optical fibers side by side and heating, fusing and elongating their lengthwise portions in the lengthwise direction to thereby form an optical coupling section.

In the case of manufacturing a polarization-maintaining optical fiber component by the fused elongation scheme, it is necessary to observe the stress applying sections and align the polarization axes of a plurality of polarization-maintaining optical fibers in order to prevent crosstalk between perpendicular polarized waves.

A typical scheme for aligning the polarization axes is disclosed in, for example, Japanese Patent Application No. 02-271307. This scheme uses the fact that the refractive indexes of the cladding and the stress applying section differ from each other, and places a light source by the polarization-maintaining optical fibers, acquires the luminance distribution of fiber images by observing the polarization-maintaining optical fibers from the opposite side to the light source and determining the positions of the stress applying sections.

When the fused elongation scheme is used, the polarization-maintaining optical fibers are fused-elongated to be thin at the optical coupling section of the polarization-maintaining optical fiber component. Therefore, the light that propagates through the polarization-maintaining optical fiber leaks to the cladding portion from the core and enters a so-called air cladding state. Under this situation, because the single mode condition for the polarization-maintaining optical fiber is not satisfied, the bending of the polarization-maintaining optical fiber and optical coupling to a high-order mode occur due to an unevenness factor in the polarization-maintaining optical fiber. They eventually appear as an excess loss of the polarization-maintaining optical fiber component.

In the case of producing an optical component using an ordinary optical fiber, the refractive index in the optical fiber is uniform except for the difference in refractive index between the core and the cladding, and the core has a small diameter of several µm. Accordingly, the optical coupling section of the fused-elongated type optical component is elongated to be thinner so that the uneven refractive index in the fiber at the optical coupling section is not large enough to induce optical coupling to a high-order mode and does not raise a problem.

In the case of producing a polarization-maintaining optical fiber component using a polarization-maintaining optical fiber, by way of contrast, stress applying sections having a diameter of ten and several µm and a low refractive index are present in the cladding. The stress applying sections exit as the very large uneven refractive index portions in contrast with the case of using an ordinary fiber. As mentioned above, therefore, coupling of propagating light to a high-order mode occurs at the optical coupling section due to a difference in refractive index between the stress applying sections and the cladding. This increases the excess loss. This problem occurs prominently in the light along the fast axis where light leaks from the core occur frequently.

One way to solve this problem is the use of a polarization-maintaining optical fiber in which the refractive index of the stress applying sections is matched with the refractive index of the cladding, as disclosed in, for example, Japanese Examined Patent Application, Second Publication, No. 62-30602. As both refractive indexes are matched with each other in this method, however, it is difficult to observe the positions of the stress applying sections based on a difference in refractive index so that the aforementioned method of adjusting the polarization axis cannot be used.

SUMMARY OF THE INVENTION

Accordingly, it is an object of the present invention to provide a polarization-maintaining optical fiber component which suppresses coupling of propagating light to a high-order mode at the optical coupling section of the polarization-maintaining optical fiber component, caused by differences in refractive index between the stress applying sections and the cladding, thus reducing excess loss.

It is another object of this invention to provide a polarization-maintaining optical fiber component by easily adjusting the polarization axis using a conventional polarization axis adjusting scheme.

To achieve the above objects, a polarization-maintaining optical fiber according to this invention has stress applying sections arranged symmetrically to each other with respect to a core in a cladding surrounding the core, and is characterized in that the largest one of those concentric circles of the core or the cladding which do not reach the stress applying sections and do not include the stress applying sections within has a diameter of 20 µm or greater.

Polarization-maintaining optical fiber components, such as a polarization-maintaining optical fiber coupler, a polarization beam splitter and a polarization beam combiner, can be manufactured by using the aforementioned polarization-maintaining optical fibers.

This invention has the following advantages.

As the polarization-maintaining optical fiber of this invention is so designed that the stress applying sections are set apart from the core when a optical component is produced, it is possible to suppress coupling of propagating light to a high-order mode which is caused by a difference in the refractive index between the stress applying sections and the cladding at the time of producing a polarization-maintaining optical fiber component. In particularly, it is possible to provide a polarization-maintaining optical fiber component which has a smaller excess loss with respect to the light in the direction of the fast axis along which the above advantage is prominent.

When this polarization-maintaining optical fiber is a PANDA type polarization-maintaining optical fiber, the design and production are easy. As the PANDA fiber is characterized by its easy axis matching, it has a low crosstalk and can provide a polarization-maintaining optical fiber component which is easily connectable to an LD light source, an amplifier, other passive polarization-maintaining optical fiber components and an axis-system optical fiber.

As the stress applying sections of the polarization-maintaining optical fiber of this invention are set apart from the core, this polarization-maintaining optical fiber is apt to have a sightly higher birefringent index, lower crosstalk between polarized waves than ordinary polarization-maintaining optical fibers. Because the length of the polarization-maintaining optical fibers used in a polarization-maintaining optical fiber component is short, however, these characteristics do not cause problems. And for same reason, poorer light loss fiber do not cause problems. Further, the polarization-maintaining optical fiber of this invention can provide an excellent polarization-maintaining optical fiber component with a smaller excess loss.

An excellent polarization-maintaining optical fiber component with a smaller excess loss can be provided by laying two or more polarization-maintaining optical fibers of this invention side by side, heating lengthwise portions of the polarization-maintaining optical fibers, fusing the heated portions, and elongating the heated portions in a lengthwise direction to thereby form a fused elongation type optical coupling section.

Further, it is possible to use the scheme of observing the positions of the stress applying sections based on a difference in refractive index between the stress applying section and the cladding and then adjusting the polarization axis.

By designing all of lead fibers of the polarization-maintaining optical fiber component to have lengths of 10 m or shorter, it is possible to provide an excellent polarization-maintaining optical fiber component with a smaller excess loss.

A polarization-maintaining optical fiber coupler, a polarization beam splitter or a polarization beam combiner, which has a smaller excess loss and for which it is easy to adjust the polarization axis, can be provided by using the polarization-maintaining optical fibers of this invention.

DETAILED DESCRIPTION OF THE PREFERRED EMBODIMENTS

The present invention will now be described in detail with reference to the accompanying drawings.

Figure 1:
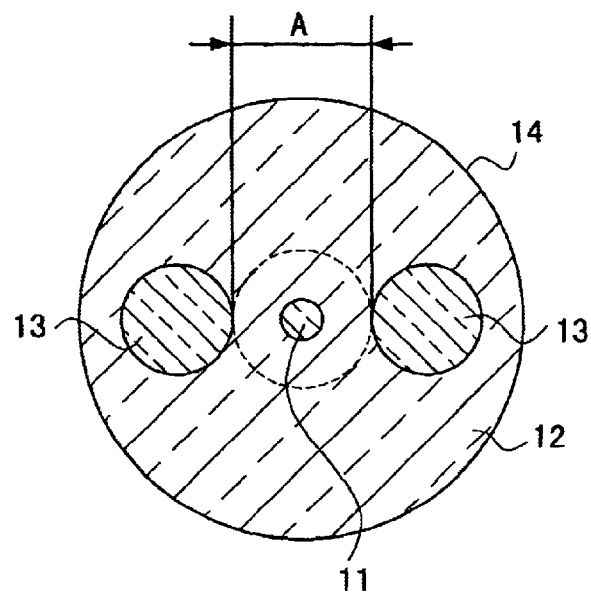
FIG. 1 is a cross-sectional view showing an example of a polarization-maintaining optical fiber which is used in this invention.

FIG. 1 illustrates one example of a polarization-maintaining optical fiber which is used in a polarization-maintaining optical fiber embodying this invention.

Figure 4:
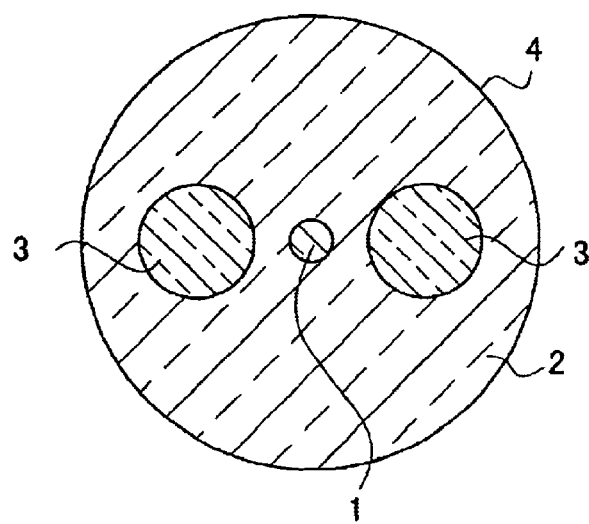
FIG. 4 is a cross-sectional view exemplifying a conventional polarization-maintaining optical fiber.

This polarization-maintaining optical fiber 14, is a PANDA fiber which comprises the same parts as the conventional PANDA fiber 4 shown in FIG. 4. In FIG. 1, numeral "11" denotes a core, numeral "12" denotes a cladding and numeral "13 denotes a stress applying section.

The PANDA fiber, as a polarization-maintaining optical fiber, has a large birefringent index, and its polarization axis is easy to match. Further, the shape of the stress applying section 13 is simple. These features facilitate the designing and production of the polarization-maintaining optical fiber. This polarization-maintaining optical fiber is therefore suitable for the polarization-maintaining optical fiber component of this invention.

This polarization-maintaining optical fiber 14 differs from the conventional PANDA fiber 4 shown in FIG. 4 in that the distance between the stress applying sections 13 is large.

This distance is determined based on the diameter A of the largest circle which is concentric to the core 11 or the cladding 12, does not reach the stress applying sections 13 and does not include the stress applying sections 13. The diameter A is set equal to or greater than 20 µm, preferably 25 to 30 µm.

This diameter range can set the distance between the core 11 and the stress applying section 13 sufficiently large. When a polarization-maintaining optical fiber component is constructed using these polarization-maintaining optical fibers 14, it is infrequent that light leaking out the core 11 at the optical coupling section does not reach the uneven-refractive-index portion of the cladding 12 or the stress applying sections 13. This suppresses coupling of the propagating light to a high-order mode so that the excess loss does not increase.

The locations of the stress applying sections 13 are defined by the aforementioned diameter A, not the distance between the core 11 and the stress applying section 13, for the following reason.

The size of the core 11 matters in defining the location of the stress applying section 13 by the distance between the core 11 and the stress applying section 13. It is however difficult to specify the size of the core 11. When the diameter of the core 11 is defined by the mode-field diameter, for example, the mode-field diameter varies according to the wavelength so that the value of the core's diameter cannot be specified. With regard to the effect of suppressing the excess loss of an actual polarization-maintaining optical fiber component, the light that has leaked out the core 11 at the optical coupling section in an air cladding state. As a result, it is not meaningful to define the diameter of the core 11.

In consideration of the above, this invention is specified by expressing the condition for maintaining a sufficient distance between the core 11 and the stress applying section 13 by using the range of the distance between the stress applying sections 13.

This diameter A is, for example, about 12 to 17 µm in the ordinary PANDA fiber 4.

Generally speaking, when the stress applying section 13 s located apart from the core 11, the stress that is applied to the core 11 from the stress applying section 13 at the time of production drops, resulting in a lower birefringent index of the polarization-maintaining optical fiber 14, deterioration of the crosstalk between polarized waves, or the like. Conventionally, therefore, the polarization-maintaining optical fiber 14 with a large diameter A as in this invention has not been manufactured.

However, the length of the polarization-maintaining optical fiber 14 used in a polarization-maintaining optical fiber component is short. Even if the polarization-maintaining optical fiber 14 whose conditions for the refractive index, crosstalk and light loss are slightly relaxed is used, this does not directly affect the characteristics of the polarization-maintaining optical fiber component and does not matter at all.

Specifically, even a polarization-maintaining optical fiber having the following characteristics does not cause any problems when it is used in a polarization-maintaining optical fiber component.

The polarization-maintaining optical fiber 14 of this invention preferably has a birefringent index of $5\times10^{-5}$ to $5\times10^{-4}$. The birefringent index of a PANDA fiber for use in ordinary communications is about $5\times10^{-4}$.

The crosstalk of the fast axis and the slow axis of the polarization-maintaining optical fiber 14 of this invention per unit length is set equal to or larger than −20 dB/km, preferably in a range of −20 to −10 dB/km. The crosstalk of the ordinary PANDA fiber 4 is about −25 dB/km.

The loss of the polarization-maintaining optical fiber 14 of this invention per unit length is set equal to or greater than 1 dB/km, substantially 1 to 10 dB/km. Note that the loss of an ordinary PANDA fiber is optimized to about 0.2 to 0.3 dB/km for an elongated use.

If the polarization-maintaining optical fiber component is constructed by using a plurality of those polarization-maintaining optical fibers 14, it is preferable that the lengths of all lead fibers of the polarization-maintaining optical fiber component to 10 m or shorter. The "lead fibers" are the portions that constitute a light entering port and light emerging port which extend from both ends of the optical coupling section of the polarization-maintaining optical fiber as will be discussed later. If the lead fibers are too long, the length of the polarization-maintaining optical fiber 14 used eventually becomes long, thus increasing the crosstalk and loss of the polarization-maintaining optical fiber component.

When a polarization-maintaining optical fiber 14 whose crosstalk per unit length is −20 kB/km is used, for example, the crosstalk for the lead fibers can be suppressed to −40 dB if the lengths of the lead fibers are 10 m. When a polarization-maintaining optical fiber 14 whose loss per unit length is 1 dB/km is used, the loss for the lead fibers can be suppressed to 0.01 dB if the lengths of the length fibers are 10 m. It is therefore possible to provide sufficiently satisfactory characteristics for the polarization-maintaining optical fiber 14.

The core 11 of the polarization-maintaining optical fiber 14 in this example is formed of quartz glass doped with germanium oxide ($GeO_2$), the cladding 12 is formed of quartz glass, and the stress applying section 13 is formed of quartz glass doped with a relatively large amount of boron oxide ($B_2O_3$). The outside diameter of the stress applying section 13, the relative refractive index difference between the core 11 and the cladding 12 and the relative refractive index difference between the cladding 12 and the stress applying section 13 are adequately set in accordance with the desired characteristics. Normally, the made-field diameter of the core 11 is set to about 4 to 10 µm and the outside diameter of the cladding 12 is set to about 125 µm.

A polarization-maintaining optical fiber component can be provided by laying a plurality of such polarization-maintaining optical fibers 14 side by side, heating lengthwise portions of the polarization-maintaining optical fibers, fusing the heated portions, and elongating the heated portions in the lengthwise direction to thereby form an optical coupling section.

At this time, those polarization-maintaining optical fibers 14 are arranged in such a way that the straight line which connects the centers of the cores 11 of the polarization-maintaining optical fibers 14 perpendicularly cross the polarization axis of each polarization-maintaining optical fiber 14. This can ensure fusion while maintaining the planes of polarization of the polarization-maintaining optical fibers 14. The "polarization axis" here is the straight line that connects the centers of the stress applying sections 13 in each polarization-maintaining optical fiber 14.

At this time, it is possible to use the scheme of observing the positions of the stress applying sections 13 based on a difference in refractive index between the stress applying sections 13 and the cladding 12 and then adjusting the polarization axis.

Further, the elongation length of the fused portions determined by the optical coupling ratio that is demanded of the polarization-maintaining optical fiber component. In other words, this elongation length adjusts the optical coupling ratio of the polarization-maintaining optical fiber component.

Figure 2:
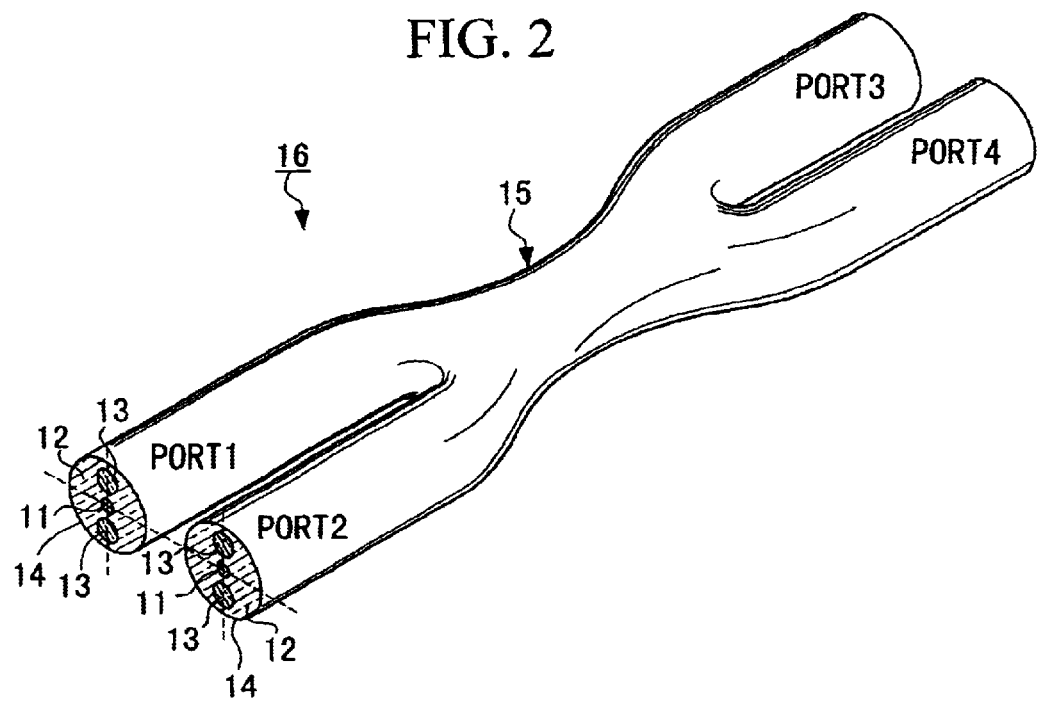
FIG. 2 is a schematic diagram showing an example of a polarization-maintaining optical fiber component embodying this invention.

FIG. 2 shows a polarization-maintaining optical fiber coupler 16 as one example of the polarization-maintaining optical fiber component of this invention. This polarization-maintaining optical fiber coupler 16 is a 2×2 type which uses two polarization-maintaining optical fibers 14 shown in FIG. 1. The polarization-maintaining optical fiber coupler 16 comprises light-incident and light-emerging ports 1 to 4 (the ports being the portions of the polarization-maintaining optical fiber 14 in the polarization-maintaining optical fiber coupled 16 from which light enters and from which light emerges), and an optical coupling section 15.

In the polarization-maintaining optical fiber coupler 16, the light that has entered the port 1 is branched and comes out of the ports 3 and 4.

The optical coupling section 15 is formed by letting light enter the port 1 along the fast axis, performing fiber elongation while measuring the amounts of emerging light at the ports 3 and 4 and stopping the fiber elongation when an optical coupling ratio of 50% is reached.

As the polarization-maintaining optical fibers 14 of this invention shown in FIG. 1 are used in this polarization-maintaining optical fiber coupler 16, it is possible to suppress coupling of light, which has leaked from the core 11 at the optical coupling section 15, to a high-order mode so that the excess loss is small.

Further, the polarization-maintaining optical fiber of this invention can employ the scheme of observing the positions of the stress applying sections 13 based on a difference in refractive index between the cladding 12 and the stress applying sections 13 and then adjusting the polarization axis.

Although a PANDA fiber has been described as one example of a polarization-maintaining optical fiber in the foregoing description, the polarization-maintaining optical fiber is not limited to such fibers. For example, this invention can be adapted to ordinary polarization-maintaining optical fibers which have stress applying sections, such as a bow tie optical fibers or an elliptic jacket optical fibers.

Although a polarization-maintaining optical fiber coupler is illustrated as an example of a polarization-maintaining optical fiber component, the polarization-maintaining optical fiber component is not limited to this type, but may be any product which is manufactured by using a polarization-maintaining optical fiber, such as a polarization beam splitter or a polarization beam combiner. Those polarization-maintaining optical components, like the above-described polarization-maintaining optical fiber coupler, can be manufactured by laying a plurality of polarization-maintaining optical fibers side by side, heating and fusing lengthwise portions of the polarization-maintaining optical fibers, and elongating the heated portions in the lengthwise direction. In the case of a polarization beam splitter which decouples polarized waves, for example, light which includes the X polarized wave and Y polarized wave is allowed to enter one light-incident port, fiber elongation is carried out while monitoring the polarized waves of the light which emerges from the two light-emerging ports and this fiber elongation is stopped when the light of the X polarized wave and Y polarized wave respectively emerge form those two light-emerging ports. The decoupling or coping of polarized waves can be made and adjusted according to conditions such as the elongation length of the optical coupling section and the distance between the cores. For a polarization beam combiner, the lights of the X polarized wave and Y polarized wave are allowed to enter two light-incident ports, fiber elongation is carried out while monitoring the polarized wave of the light which comes out of one light-emerging port and this fiber elongation is stopped when the combined light of the X polarized wave and Y polarized wave, which are combined at a desired ratio, emerges from this light-emerging port.

Embodiments

Embodiments of this invention will now be discussed in detail.

(First Embodiment)

Two PANDA fibers having a diameter A of 22 μm were laid side by side and their lengthwise portions were heated and fused. Then, fiber elongation was carried out in the lengthwise direction while monitoring only the light along the fast axis and was stopped when the coupling ratio of two light-emerging ports became 50%, thus forming the optical coupling section 15. This completed a 2×2 polarization-maintaining optical fiber coupler.

Then, the light loss of this polarization-maintaining optical fiber coupler along the fast axis was measured by the cutback scheme. The light loss along the fast axis then was 0.8 dB.

(Second Embodiment)

A polarization-maintaining optical fiber coupler according to the second embodiment was prepared in the same way as for the first embodiment, except that the diameter A was set to 27 μm, and the light loss of this polarization-maintaining optical fiber coupler along the fast axis was measured.

The light loss along the fast axis then was 0.4 dB.

(Comparative Example)

A polarization-maintaining optical fiber coupler 16 of this comparative example was prepared in the same way as for the first embodiment, except that the diameter A was set to 17 μm, and the light loss of this polarization-maintaining optical fiber coupler along the fast axis was measured.

The light loss along the fast axis then was 16 dB.

Figure 3:
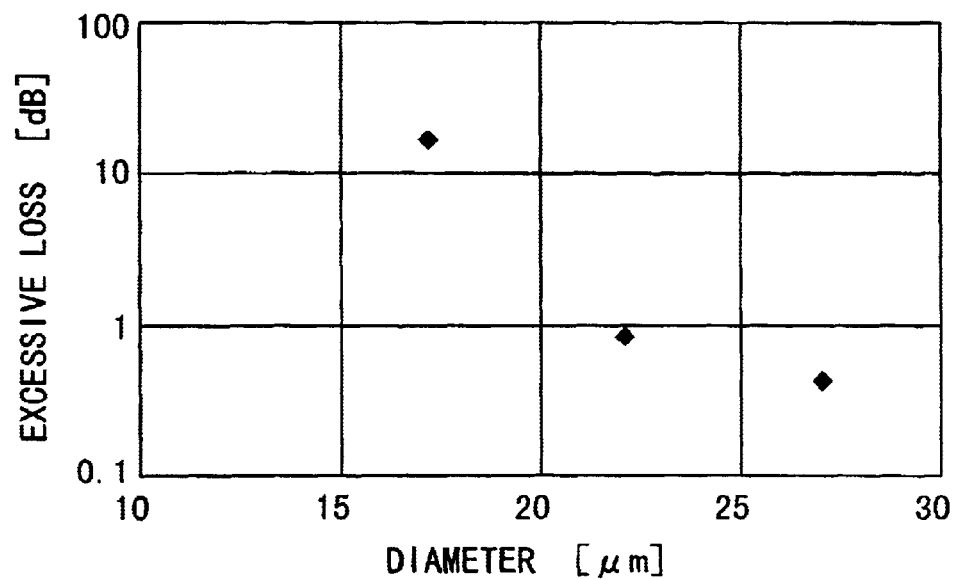
FIG. 3 is a graph depicting the relationship between a diameter A of a concentric circle and excess loss according to one embodiment of this invention.

FIG. 3 presents a graph in which the relationship between the excess loss along the fast axis when fusion elongation makes the coupling ratio of two light-emerging ports with respect to the light along the fast axis become 50% and the diameter A is plotted. It is apparent from this graph that for the excess loss to become equal to or less than 1 dB, the diameter A should be equal to or greater than 20 μm.

What is claimed is:

1. A polarization-maintaining optical fiber component produced by the steps of:

laying two or more polarization-maintaining optical fibers side by side; and heating lengthwise portions of said polarization-maintaining optical fibers, fusing these heated portions, and elongating said heated portions in a lengthwise direction to thereby form an optical coupling section;

wherein said polarization-maintaining optical fiber having stress applying sections arranged symmetrically to each other with respect to a core in a cladding surrounding said core, and a largest one of a plurality of circles concentrically provided with said core or said cladding, which do not reach said stress applying sections and do not include said stress applying sections within a diameter of 20 um or greater; and said polarization-maintaining optical fiber component is a polarization beam splitter or a polarization beam combiner.

2. The polarization-maintaining optical fiber component according to claim 1, wherein all lead fibers of said polarization-maintaining optical fiber component have lengths of 10 m or shorter.

3. The polarization-maintaining optical fiber component according to claim 1, wherein said polarization-maintaining optical fiber component is a polarization-maintaining optical fiber coupler.

4. The polarization-maintaining optical fiber component according to claim 1, wherein said polarization-maintaining optical filter is a PANDA type polarization-maintaining optical filter.

5. The polarization-maintaining optical fiber component according to claim 1, wherein said polarization-maintaining optical filter has a briefringent index of $5\times10^{-5}$ to $5\times10^{-4}$.

6. The polarization-maintaining optical fiber component according to claim 1, wherein crosstalk of said polarization-maintaining optical filter is equal to or greater than −20 db/km.

7. The polarization-maintaining optical fiber component according to claim 1, wherein loss of said polarization-maintaining optical filter is equal to or greater than 1 db/km.

* * * * *